B. C. SMALL.
CORN HARVESTER AND HUSKER.
APPLICATION FILED AUG. 30, 1907.

1,136,624.

Patented Apr. 20, 1915.
10 SHEETS—SHEET 1.

Fig. 1.

Witnesses:
Albert J. Sauser
L. V. Domarus Jr.

Inventor:
Byron C. Small
by Buckley Durand
and Drury
Attorneys

B. C. SMALL.
CORN HARVESTER AND HUSKER.
APPLICATION FILED AUG. 30, 1907.

1,136,624.

Patented Apr. 20, 1915.
10 SHEETS—SHEET 6.

UNITED STATES PATENT OFFICE.

BYRON C. SMALL, OF THAYER, ILLINOIS.

CORN HARVESTER AND HUSKER.

1,136,624.

Specification of Letters Patent.

Patented Apr. 20, 1915.

Application filed August 30, 1907. Serial No. 390,816.

*To all whom it may concern:*

Be it known that I, BYRON C. SMALL, a citizen of the United States of America, and resident of Thayer, Sangamon county, Illinois, have invented a certain new and useful Improvement in Corn Harvesters and Huskers, of which the following is a specification.

My invention relates to improvements in corn husking machines, and has for its object the production of a device by means of which the alinement of the feed rollers may be varied, thereby providing for giving the proper angle of inclination to the ears of corn just before they encounter the knocker bar.

A further object is the production of means whereby the husking means proper may be shifted without varying the load on the traction wheels.

A further object is the production of rolls of a peculiar construction to be operated in connection with a rotary or spiral knocker bar.

A further object is the production of a machine that can be cheaply constructed, and one that is least liable to disarrangement of parts.

These and such other objects as will more fully appear in the specifications, are attained by my device, embodiments of which are illustrated in the accompanying drawings, in which—

Like numerals of reference indicate like parts in the several figures of the drawing.

Figure 1:
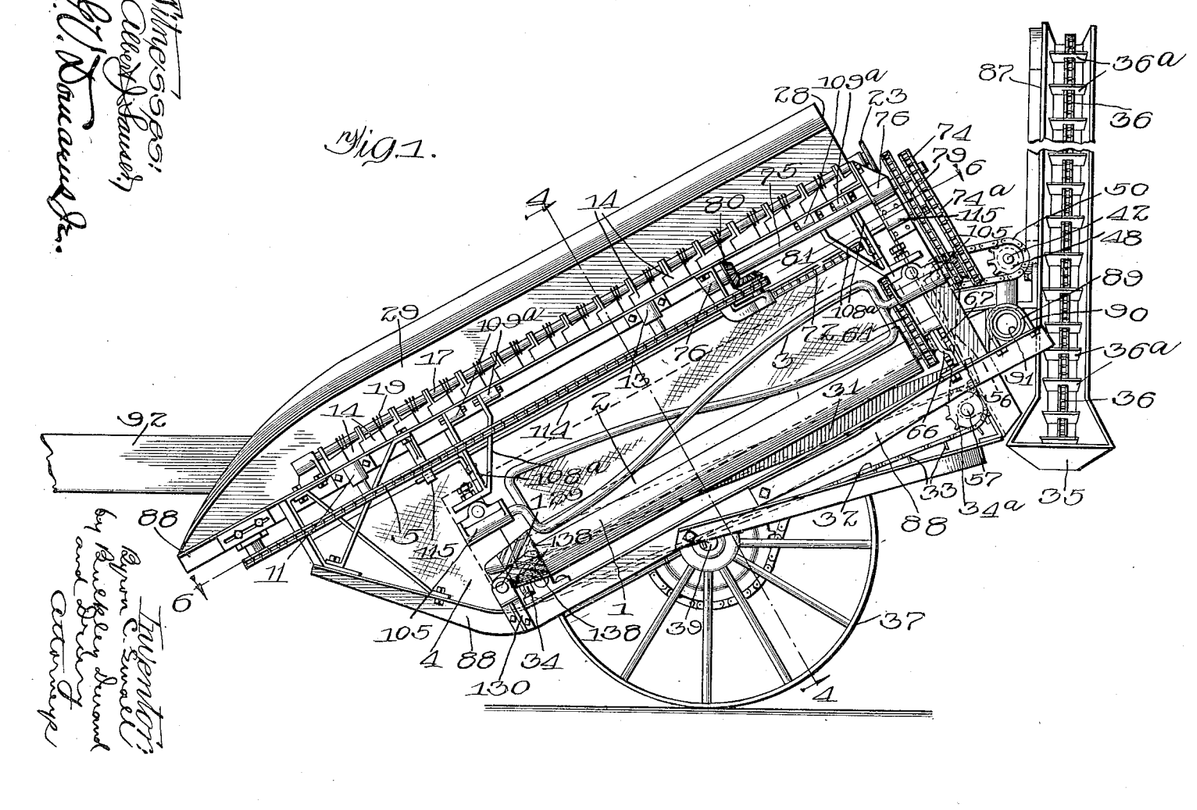
Figure 1 represents a side elevation of my machine.
Figure 2:
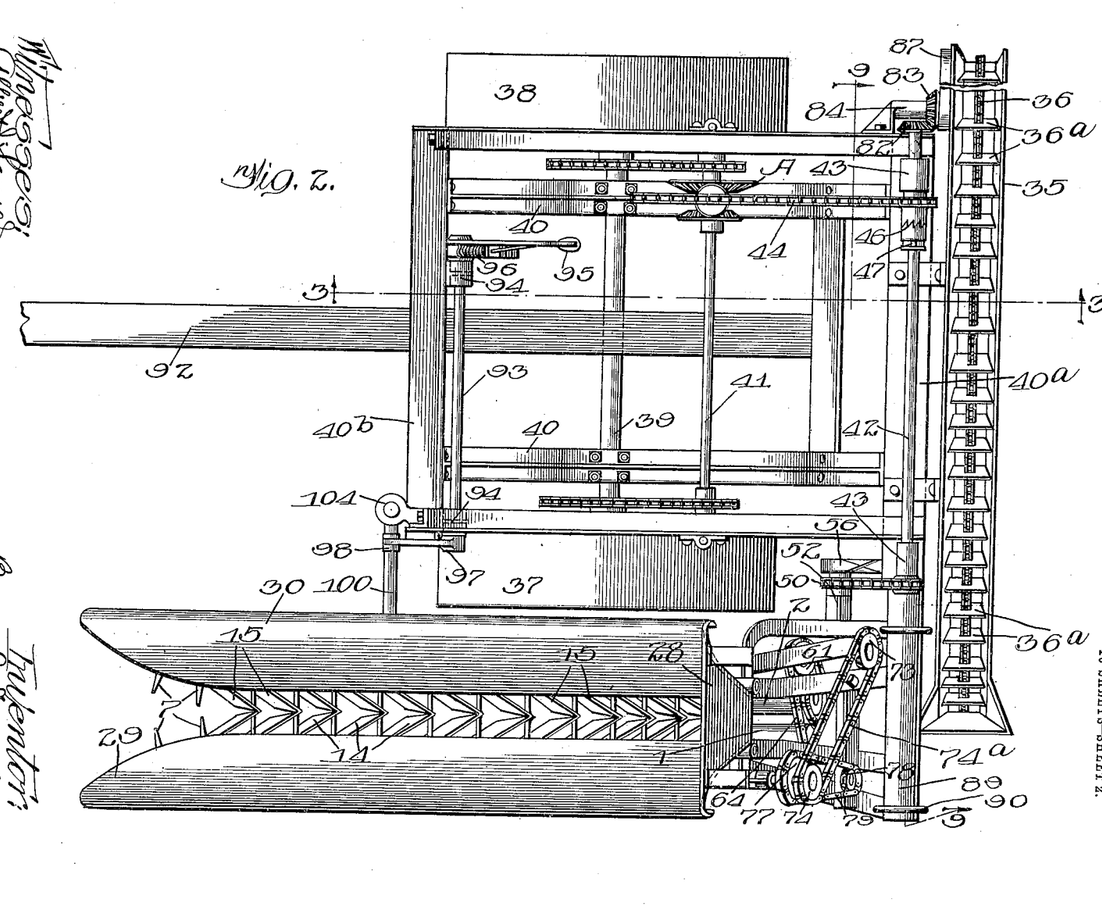
Fig. 2 is a plan view of Fig. 1.
Figures 3, 23:
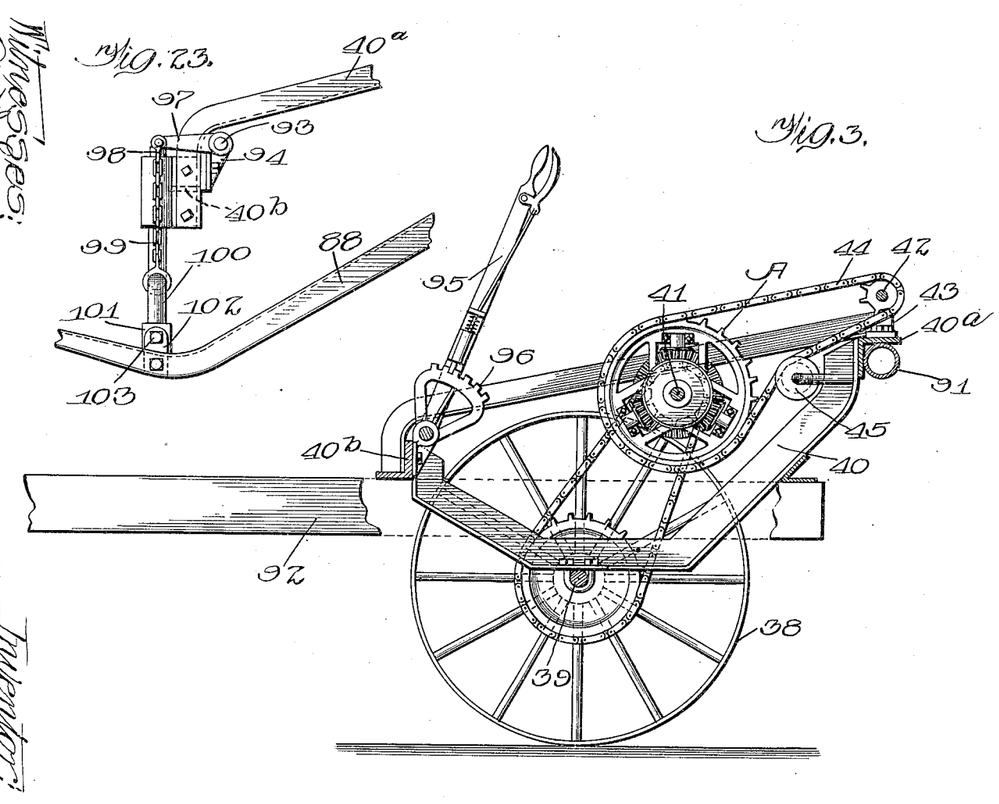
Fig. 3 is a sectional view on line 3—3 of Fig. 2, looking in the direction indicated by the arrows.
Fig. 23 is a sectional view on line 23—23 of Fig. 22, looking in the direction indicated by arrows.
Figure 4:
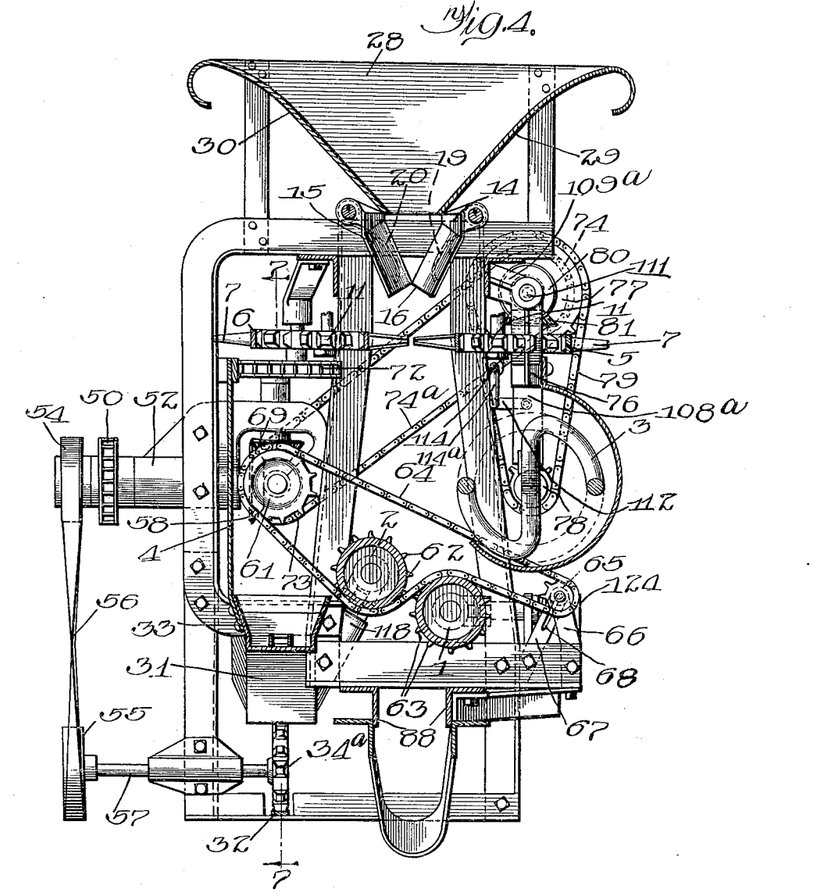
Fig. 4 is a sectional view on line 4—4 of Fig. 1, looking in the direction indicated by the arrows.
Figure 5:
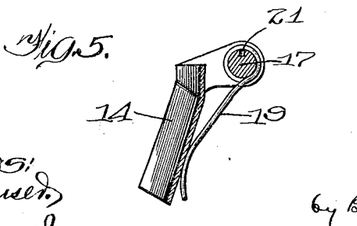
Fig. 5 is a sectional view of a detail showing the shield blade and strengthening spring.
Figures 6, 7, 8:
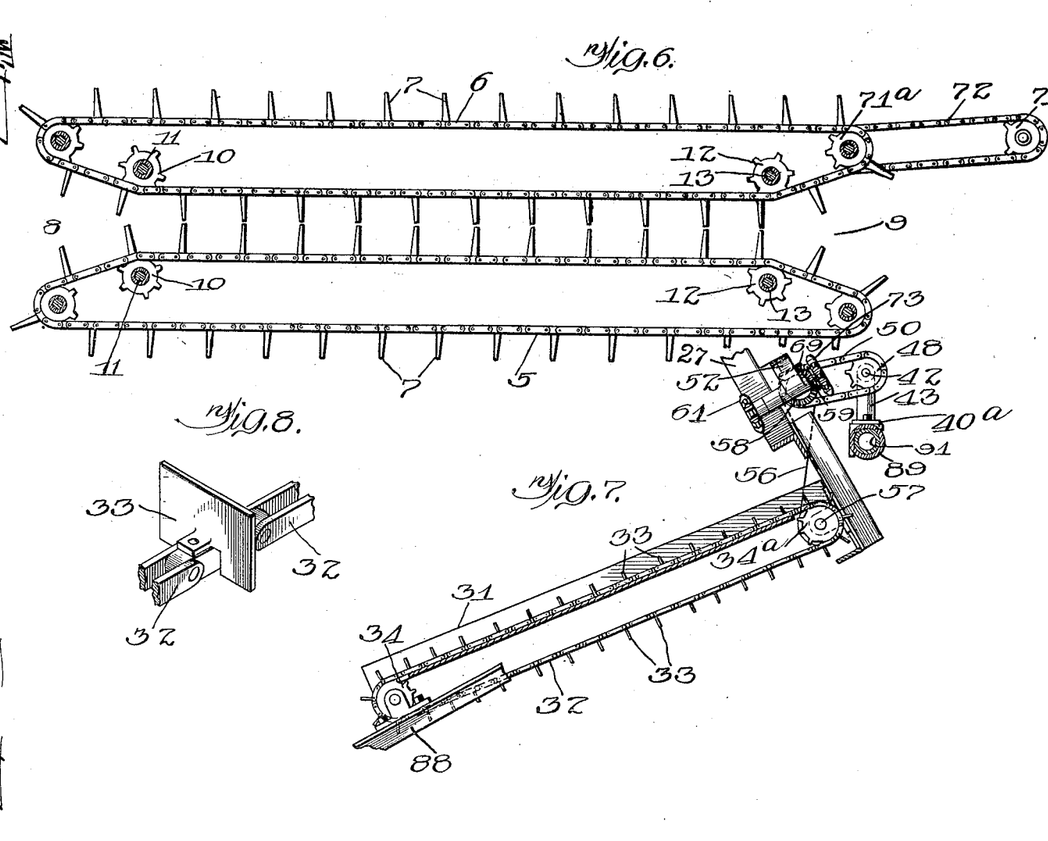
Fig. 6 is a detail sectional view showing the arrangement of the feed chains, on the line 6—6 of Fig. 1.
Fig. 7 is a view showing a detail of the lower trough.
Fig. 8 is a detail view, in perspective, of a scraper blade secured to the chains.
Figure 10:
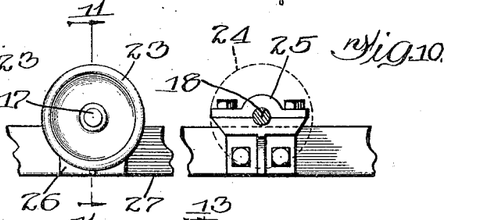
Fig. 10 is a detail of Fig. 1, showing the spring shafts, the wheel of one shaft being removed.
Figure 11:
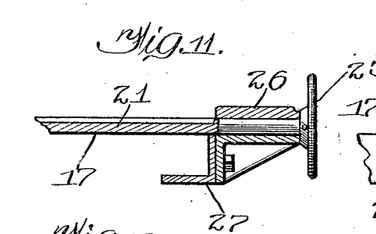
Fig. 11 is a sectional view on line 11—11 of Fig. 10, looking in the direction indicated by arrows.
Figure 15:
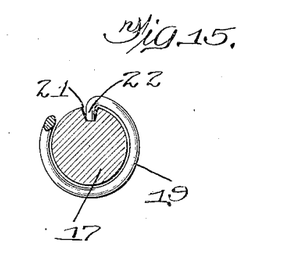
Fig. 15 is a sectional detail showing how the tension spring is secured to the bar.

Referring now to Fig. 1, the feed rolls 1 and 2 are placed at an angle to the line of draft with the lower ends near the ground in order to engage the lowest possible stalk. One of said rolls, for instance 2, is mounted a little higher than roll 1 to insure a perfect feed of the stalk to the beater or knocker bar 3. As the beater 3 is revolved, it breaks the ear of corn from the husk and throws it against the canvas guard 4, from which it falls into the trough or conveyer. The feed chains 5 and 6, which run parallel to the feed rolls 1 and 2, are mounted above the trough in order to prevent the stalk from falling back, and are provided with hooks or fingers 7, adapted to engage the stalks. Referring to Fig. 6, it will be noted that these chains are offset in the front at 8 to insure a positive feed, and in the rear at 9 in order to insure a proper release from the corn. These offsets are formed by placing the idler sprockets 10, 10, at the front, mounted on bearings 11, 11, and by placing idler sprockets 12, 12, at the releasing point in bearings 13, 13. The upper end of the stalk is held in position by shields or tipping blades 14, 15, set at an angle to their carrying shaft and having tapering points 16, 16, which serve to tip the point of the ear upwardly. These shields are mounted on carrying shafts or bars 17, 18, and held inwardly by tension springs 19, 20. These springs are coiled or re-coiled, and different degrees of tension maintained by cutting a groove 21 along the shafts and forming on the end of the springs a projection 22 adapted to engage the groove 21, as shown in Fig. 15. When the shaft is revolved, as shown in Figs. 10 and 11, through the wheels 23, 24, the tension on the springs is varied to any desired extent. The shafts are held in position and clamped by boxes or bearings 25, 26, mounted on the frame or angle iron 27, and a plate 28 as shown in Fig. 4 is placed above the shield blades 14, 15, forming an end for the sides 29, 30. As the corn leaves the knocker bar it falls into the conveyer 31 having a drive chain 32 carrying projections or blades 33 as shown in Figs. 7 and 8, running on sprockets 34 and 34$^a$. The ears of corn are then brought along to another conveyer 35 at the end of the machine, having a chain 36 and projections or blades 36$^a$, and here is loaded on to wagons or other suitable vehicles for delivery. The wheels 37 and 38 are mounted on the shaft 39 which is fastened to T-irons 40 of the main frame. As shown in Fig. 3, a differential drive A is mounted on the drive shaft 41, which causes the wheel 38 to drag or pull hard as soon as work is imposed upon the wheels. No specific claim is made for invention on this device, as a separate application has been filed, on even date herewith, Serial No. 390,817, covering this invention.

Figures 25, 26:
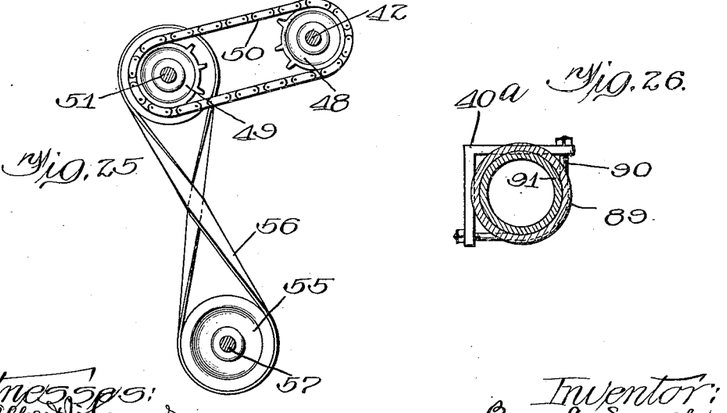
Fig. 25 is a detail view of Fig. 1, showing the drives for the main gearing.
Fig. 26 is an enlarged sectional detail of a portion of Fig. 2.
Figure 27:
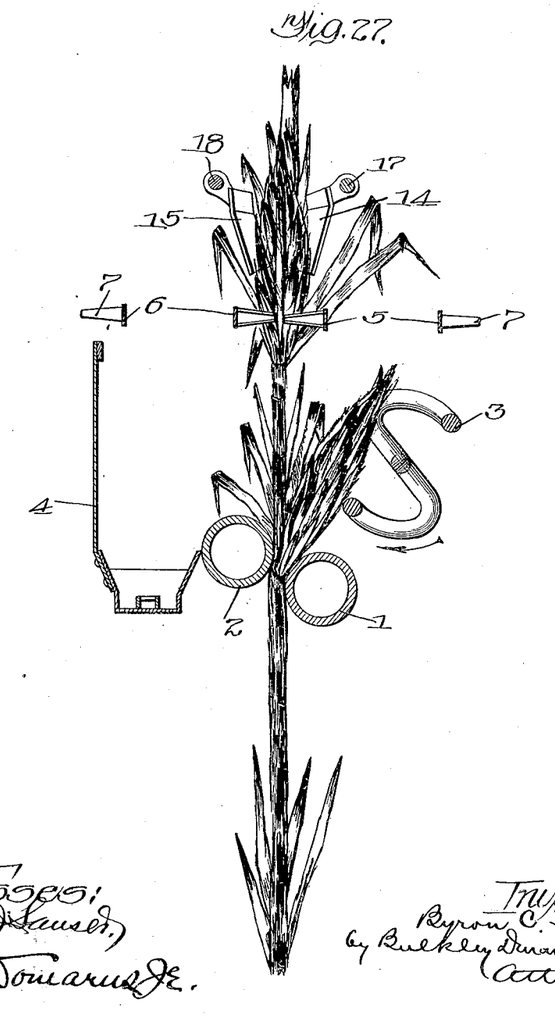
Fig. 27 is a sectional view showing a portion of Fig. 4, together with a stalk of corn being operated on by the straightening blades and knocker bar.

In Fig. 3, mounted on the frame or angle iron 40$^a$ is a shaft 42 held in bearings 43. This shaft is driven over the differential drive A by means of a chain 44. On the frame 40 is mounted an idler wheel 45, to take up the slack on the chain 44. A clutch 46 is mounted on the shaft 42 and operated by an end lever 47 to control the motion of the machine. On the end of the shaft 42 is mounted a sprocket 48, which transmits motion to the sprocket 49 through a chain 50 thence to a shaft 51, as shown in Figs. 25 and 7.

As shown in Fig. 4, the shaft 51 is carried in a bearing 52 bolted to a frame or angle bar 27. On the end of this shaft is carried a pulley 54, which drives a second pulley 55 through a reversing belt 56, which in turn drives a shaft 57 carrying the sprocket 34$^a$.

Figure 14:
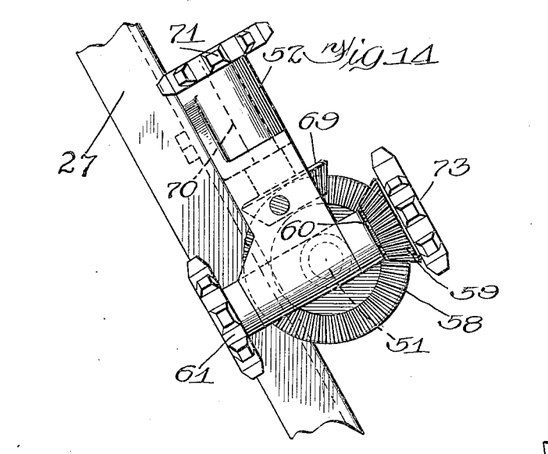
Fig. 14 is an enlarged view showing the main gearing.

As shown in Figs. 4 and 14, on the shaft 51 is a beveled gear 58 which meshes with the beveled gear 59 keyed to the stud-shaft 60. On one end of this stud shaft is carried a sprocket 61 which drives the sprockets 62 and 63 through a chain 64. This chain runs around an idler 65 mounted on brackets 66 and 67, which are carried on the frame. The bracket 67 is provided with a slot 68, whereby the position of the idler 65 is adjusted, thereby regulating the tension on the chain 64. Meshing with the beveled gear 58 is a second beveled gear 69, on the end of the shaft 70 carried in the bearing 52. Mounted on the shaft 70 is a sprocket 71, which drives the sprocket 71$^a$ through a chain 72, thus transmitting motion to the feed chain 6.

As shown in Fig. 14, fixed to the gear 59 is a sprocket 73 which transmits motion to the sprocket 74 through a chain 74$^a$, mounted on a shaft 75 which is hung in bearings 76 as seen in Fig. 1. Mounted on the shaft 75 is a sprocket 77 which transmits motion through a chain 79 to a sprocket 78, mounted on the beater bar 3. Keyed to the shaft 75 is a beveled gear 80 which meshes with a second beveled gear 81 which is fastened to the sprocket 12, thus transmitting motion to the feed chain 5.

Figure 9:
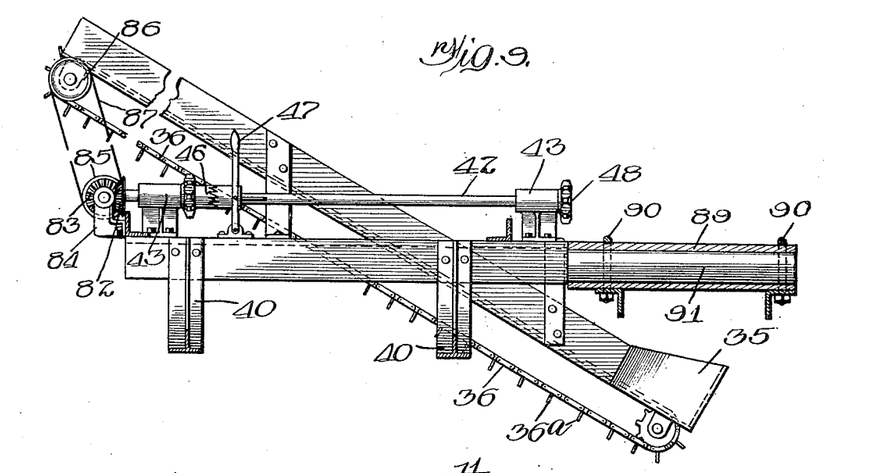
Fig. 9 is a detail view of the upper trough showing the clutch mechanism.

As shown in Fig. 9, mounted on the outer end of the shaft 42 is a beveled gear 82 meshing with a second beveled gear 83 mounted in a bracket 84. Fastened to the gear 83 is a pulley 85, which drives a second pulley 86 of the conveyer 35, by means of a belt 87. The corn picking mechanism is adapted to be raised and lowered as desired, it being carried on the frame 88 which is fastened to a pipe 89 by means of bolts 90. This pipe 89 pivots on a pipe 91, which is stationary, and carried on the frame or angle iron 40$^a$.

Figures 22, 24:
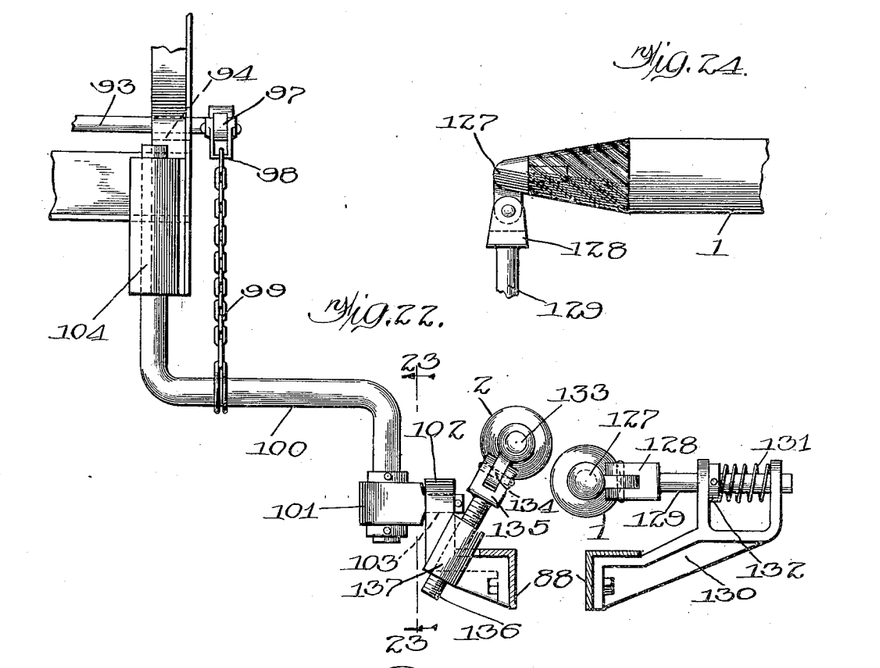
Fig. 22 is an end view of a portion of Fig. 1, showing the lifting bar and lower roller supports.
Fig. 24 is an enlarged detail of a portion of Fig. 22, showing the lower end of the husking roll and connection therefor.

As shown in Figs. 3, 22 and 23 carried on the stationary frame 40$^b$ and mounted on a tongue 92 is a shaft 93 held in bearings 94. On the shaft 93 is fastened a lever 95 adapted to engage a ratchet 96, which ratchet is locked to the frame 40$^b$. On the outer end of said shaft 93 is mounted an arm 97, which is keyed to the shaft. Fastened to the arm 97 is a clevis 98, to which is fastened a chain 99, attached to a crank bar 100. This bar 100 is locked to a box or bearing 101, which is pivoted to a second box 102 at 103. This box 102 is fastened on the frame 88. At the end, said crank bar is kept in a vertical position, by sliding in bearings 104 fastened to the frame 40$^b$. It will be seen that when the shaft 93 is rocked, the arm 97 is raised or lowered, thereby raising or lowering the corn picker mechanism which is attached to the bar 100 through mechanism already described.

As shown in Figs. 18 to 21, it will be seen that the beater bar 3 is carried in a self lining bearing 105 pivoted on a stud 106. Fastened to this stud 106 is an eye bolt 107 to which is fastened a bracket 108 which is adjusted by means of lock nuts 109. The bracket 108, having arms 108ª, is pivoted to bearings 109ª, carried on the frame 88. The arms 108ª are provided with slots 110, whereby it may be raised or lowered, as occasion requires. The brackets 109ª carry bolts 111, by which the arms 108ª are held in place. Pivoted to the arms 108ª is a link 112, pivoted at 113 on a bar or crank shaft 114, which is held in position by boxes or bearings 115. It will be seen that as the bar 114 is turned by hand, the arm or projection 114ª swings in or out, thereby causing the hanger 108 to change its position, also causing the beater bar to move in or out as desired, thus providing a positive lateral adjustment for said bar.

Figure 16:
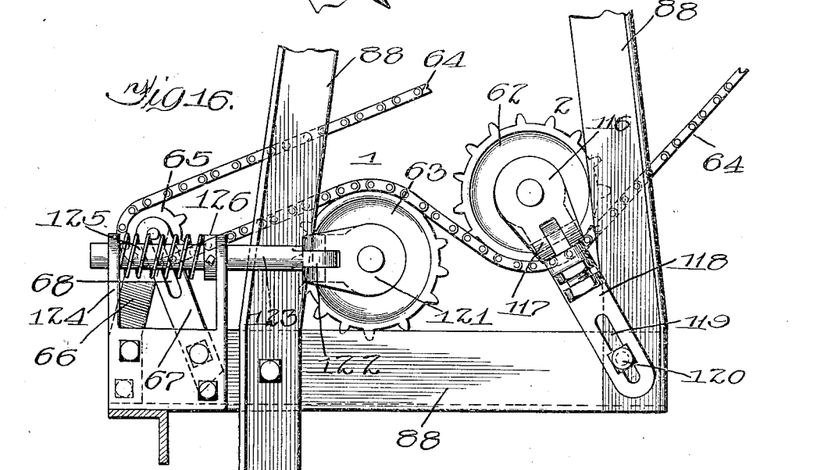
Fig. 16 is a detail view of a portion of Fig. 4, showing the roller drive and upper bearing of the rollers.
Figure 17:
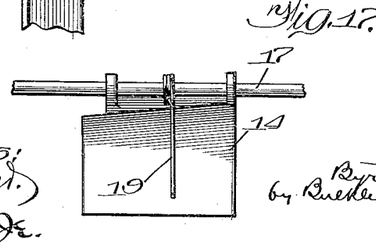
Fig. 17 is a front elevation of a spring blade.
Figures 18, 19, 20, 21:
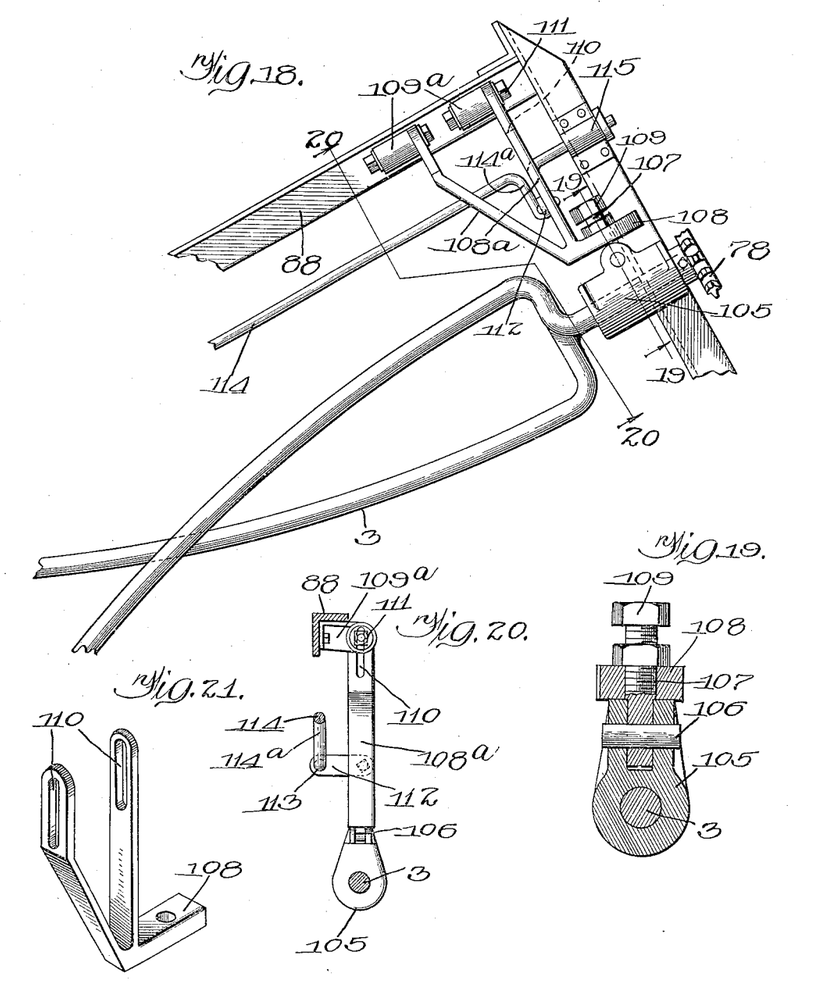
Fig. 18 is a detail view of a portion of Fig. 1, showing the upper end bearing for the knocker bar and knocker bar hanger.
Fig. 19 is a sectional view on line 19—19 of Fig. 18, looking in the direction indicated by arrows.
Fig. 20 is a sectional view on line 20—20 of Fig. 18, looking in the direction indicated by arrows.
Fig. 21 is a perspective view of a knocker bar hanger.

As shown in Fig. 16, the feed rolls 1 and 2 are at their upper ends journaled inadjustable or self lining bearings. Mounted on the roll 2 is a bearing 116 pivoted at 117, carried on an arm 118. On the arm 118 is a slot 119, through which passes a bolt 120, fastened to the frame 88. By this arrangement, the roll can be adjusted vertically. Mounted on the roll 1 is a bearing 121, pivoted at 122, carrying an arm 123, which passes through a bracket 124. On the arm 123 is a spring 125 and collar 126, which causes a return of roll 1 as the stalk enters, and thereby also keeping a certain amount of tension on same.

As shown in Fig. 22, at the lower ends of rolls 1 and 2 are carried similar brackets and adjustments. On the feed roll 1 is a bearing 127, pivoted at 128, carrying an arm 129, which slides through a bracket 130, fastened to the frame 88. The tension spring 131, held in place by a collar 132, produces an even tension on the roll 1. On the feed roll 2 is carried a bearing 133, pivoted at 134, carrying an arm 135, which has a screw threaded portion 136 engaging a lug 137, fastened on the box 102, thereby permitting a vertical adjustment.

Figure 12:
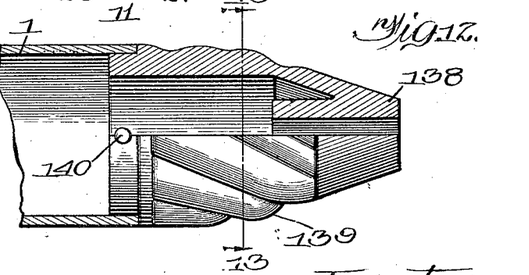
Fig. 12 is a view partly in section showing the end of one of the feed rolls.
Figure 13:
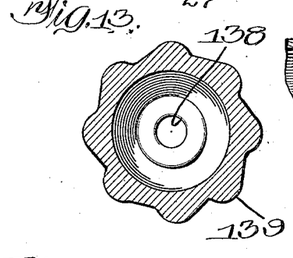
Fig. 13 is a sectional view on line 13—13 of Fig. 12, looking in the direction indicated by arrows.

As shown in Figs. 12 and 13, the feed rolls 1 and 2 are provided with a tapering end 138 of cast iron, having corrugations 139. This end 138 is fastened to the roll 1 in any well known manner, as by a pin 140. As will be seen, the corrugations 139 run around the periphery of cast iron end 138, causing the corn stalks to feed upwardly.

All portions of my device are readily adjustable so it may be used to advantage, regardless of the height of the stalks, or the position of the ears on the stalks, &c., and possesses many advantages not present in machines of this character now in use. It will be noted that the feed rollers are smooth, except at the tapering ends, where the spiral corrugations facilitate the starting of the stalks between the rolls. The outside roller is mounted so as to have a horizontal sliding motion away from the other roll, being held in place by a spring. The inside roller has a similar motion, but, being located a little above the other, prevents the undue bending of the stalk at one side, but throws the top of the ear of corn away from the stalk and brings it into position to be struck by the knocker bar, and knocked from the husk.

The revolving knocker bars or beaters comprising two or more bars, are mounted on a common axis, and are evenly balanced, and from their shape it will be seen that only a few ears are struck at the same instant. These bars are also so hung as to accommodate different sizes of ears, and means may be provided to permit a horizontal adjustment in order to adapt the device to varying conditions of the corn with respect to toughness, brittleness, &c. The inside roller being also adjustable perpendicular to the line of the rolls, thus varies the throw given to the top of the ear just before it is struck by the knocker bar. Both the knocker bar and the upper ends of the rollers are mounted in a bearing that is self alining in any direction. It has, in addition to its inside chain and blade, a wall of canvas fastened along the side against which the corn is thrown or knocked, and from which it falls into the conveyer.

Just above the feed or gathering chains are the spring actuated shield blades adapted to rub along the stalk upwardly, tipping the points of the ears upwardly and preventing the ears from entering the rolls ends first, as well as preventing the ears from dropping down the hooks on the chains and being pulled from the stalks. The shields possess individual freedom of movement of the blades, thus allowing the stalks to pass from set to set toward the top of the rolls. The shields are also spring actuated, and have projections or lugs through which the shaft passes to support them, but are free to rotate on said shaft, being pressed together by the springs which have the projections dropping into the slot as shown in Fig. 15; and the shaft is provided with rotating means whereby the tension of the springs may be regulated. The entire husking mechanism is pivoted upon a pipe or support on the upper rear portion of the main frame, so as to permit the raising and lowering of the shields, rolls, etc., without disturbing the balance of the machine.

I claim:

1. In a corn husking machine, the combination of a frame, power transmitting mechanism, gathering rolls, and a spiral knocker bar.

2. In a corn husking machine, the combination of a frame, power transmitting mechanism, gathering rolls, a knocker bar, and spring actuated shield blades.

3. In a corn husking machine, the combination of a frame, power transmitting mechanism, gathering rolls, a spiral knocker bar, and spring actuated shield blades.

4. In a corn husking machine, the combination of a frame, power transmitting mechanism, gathering rolls, the lower ends of which are corrugated, and a spiral knocker bar.

5. In a corn husking machine, the combination of a frame, power transmitting mechanism, gathering rolls the lower ends of which are formed with spiral corrugations, and a spiral knocker bar.

6. In a corn husking machine, the combination of a frame, power transmitting mechanism, gathering rolls the lower ends of which are corrugated, a knocker bar, and spring actuated shield blades.

7. In a corn husking machine, the combination of a frame, power transmitting mechanism, gathering rolls the lower ends of which are formed with spiral corrugations, a knocker bar, and spring actuated shield blades.

8. In a corn husking machine, the combination of a frame, power transmitting mechanism, a pair of gathering rolls, one being higher than the other, and a spiral knocker bar.

9. In a corn husking machine, the combination of a frame, power transmitting mechanism, a pair of gathering rolls, one being higher than the other, a spiral knocker bar, and means for varying the relative position of said rolls.

10. In a corn husking machine, the combination of a frame, power transmitting mechanism, a pair of gathering rolls, one being higher than the other, a knocker bar, and spring actuated shield blades.

11. In a corn husking machine, the combination of a frame, power transmitting mechanism, a pair of gathering rolls, one being higher than the other, a knocker bar, and spring actuated shield blades.

12. In a corn husking machine, the combination of a frame, power transmitting mechanism, gathering rolls, and an adjustable spiral knocker bar.

13. In a corn husking machine, the combination of a frame, power transmitting mechanism, husking means comprising gathering rolls, and a spiral knocker bar, said husking means being pivotally secured at its upper end to the frame so that the relative position of its parts may be varied without disturbing the balance of the machine.

14. In a corn husking machine, the combination of a frame, power transmitting mechanism, husking means comprising a pair of gathering rolls, one being higher than the other, a knocker bar, and spring actuated shield blades, said husking means being pivotally secured at its upper end to the frame so that the relative position of its parts may be varied without disturbing the balance of the machine.

15. In a corn husking machine, the combination of a frame, power transmitting mechanism, adjustable gathering rolls occupying different heights with respect to each other, and provided with spirally corrugated ends, a knocker bar comprising a plurality of spiral bars, spring actuated shield blades, and means for varying the tension of said blade springs.

16. In a corn husking machine, the combination of a frame, power transmitting mechanism, adjustable gathering rolls occupying different heights with respect to each other, and provided with spirally corrugated ends, a knocker bar comprising a plurality of spiral bars, spring actuated shield blades, and means for varying the tension of said blade springs, said corn husking mechanism being pivotally mounted on said frame.

17. In a corn husking machine, a frame, power transmitting mechanism, gathering rolls, a positively driven rotary knocker bar, and means for feeding stalks to said machine in such a manner that the knocker bar knocks the ears from the stalks while the butt of the ear is held between the gathering rolls, whereby the husks are held to the stalks.

18. In a corn husking machine, the combination of a frame, power transmitting mechanism, husking means comprising gathering rolls and a knocker bar, said husking means being pivotally secured at its upper end to the frame so that the relative position of its parts may be varied without disturbing the balance of the machine.

19. In a machine of the class described, the combination of toothed feed chain mechanism, roller mechanism mounted back of said toothed feed chain mechanism and adapted to engage the stalks of the material to be operated upon, and a rotary beater located between the roller mechanism and the feed chain mechanism and adapted to remove the ears from the stalks.

20. In a machine of the class described, the combination of a pair of toothed feed chains having adjacent rearwardly moving laps adapted to receive the stalks of material to be operated upon therebetween, a pair of rolls adapted to receive the stalks of the material to be operated upon therebetween, a rotary beater located between said feed chains and rolls, and a portable frame upon which said feed chains, rolls and rotary beater are mounted.

21. In a machine of the class described, the combination of a feed chain having a feeding lap extending and movable upward and rearward at an incline and adapted to engage the stalks of the material to be operated upon, a rotary beater having forwardly movable stalk and ear engaging blades, adapted to move rearward away from the feed chain mechanism when said blades are out of engagement with the stalks and means adjacent to the rotary beater adapted to feed the stalks of the material to be operated upon past the beater in a direction opposite to the direction of movement of the stalk engaging portions of said beater.

22. In a machine of the class described, the combination of a feed chain having a feeding lap adapted to travel upward and rearward at an incline in engagement with the stalks of the material to be operated upon, a pair of rolls adapted to engage the stalks, a rotary beater located between said rolls and feed chain and having stalk and ear engaging blade portions adapted to move in a direction opposite to that of the movement of the stalks relatively to the beater, and a portable frame upon which said elements are mounted.

23. In a machine of the class described, the combination of a feed chain having an inclined feeding lap adapted to travel upward and rearward at an incline in engagement with the stalks of the material to be operated upon, a pair of rolls adapted to engage the stalks, a rotary beater located between one of said rolls and the feeding lap of the feed chain and having stalk and ear engaging blade portions adapted to move in a direction opposite to that of the stalks engaged thereby, and a portable frame having longitudinally extending frame arms provided with a space therebetween and each in supporting engagement with one of said rolls.

24. In a machine of the class described, the combination of a feed chain having a feeding lap adapted to travel upward and rearward at an incline in engagement with the stalks of the material to be operated upon, a pair of rolls adapted to engage the stalks, a rotary beater located between one of said rolls and the feed chain, and means for yieldingly supporting said rolls with respect to each other.

25. In a machine of the class described, the combination of feed chain mechanism, having forwardly and rearwardly extending portions provided with a space therebetween and adapted to engage stalks of material to be operated upon, a pair of rolls mounted back of the forward portion of said feed chain mechanism, a rotary beater located between one of said rolls and the feed chain mechanism, a portable frame upon which said elements are mounted, means for yieldingly supporting one of said rolls, and means for supporting the lower end of the beater and adapted to permit the adjustment of the beater with respect to the rolls.

26. In a machine of the class described, the combination of a portable frame provided with a longitudinal passage, upwardly and rearwardly inclined rolls mounted on opposites sides of said passage and adapted to permit the passage of the stalks of the material to be operated upon therebetween and in engagement therewith, and a rotary beater extending upward and rearward at an incline in front of one of said rolls and having upwardly and forwardly moving stalk engaging beater blades extending into said passage and adapted to move downwardly and rearwardly toward said rolls when said beater blades are out of engagement with the stalks.

27. In a machine of the class described, the combination of a portable frame provided with a longitudinal passage, upwardly and rearwardly inclined rolls journaled on opposite sides of said passage and adapted to admit stalks therebetween, a rotary beater on one side of said passage in front of one of said rolls, and a conveyer on the opposite side of the passage from the rotary beater 28. In a machine of the class described, the combination of a portable frame provided with a longitudinal passage, upwardly and rearwardly inclined rolls journaled on opposite sides of said passage and adapted to engage and permit the passage of stalks therebetween, a receptacle beside said passage, and an upwardly and rearwardly inclined rotary beater on the opposite side of the passage from the receptacle adapted to remove the ears from the stalks and deliver said ears into the receptacle.

Signed by me at Thayer, Ills., this 27th day of Aug. 1907.

BYRON C. SMALL.

Witnesses:
W. F. SCHAEFFER,
HENRY MIELHOUSE.

Copies of this patent may be obtained for five cents each, by addressing the "Commissioner of Patents, Washington, D. C."